United States Patent [19]

Jenkins

[11] 3,823,948

[45] July 16, 1974

[54] DISC UNLOADING APPARATUS

[75] Inventor: William Melchior Jenkins, Leander, Tex.

[73] Assignee: International Business Machines Corporation, Armonk, N.Y.

[22] Filed: Nov. 13, 1972

[21] Appl. No.: 306,272

[52] U.S. Cl. .......... 274/9 B
[51] Int. Cl. .......... G11b 25/04
[58] Field of Search .......... 274/9 B, 1 R, 42

[56] References Cited

UNITED STATES PATENTS 2,555,594 6/1951 Markovitz .......... 274/42

FOREIGN PATENTS OR APPLICATIONS 869,376 5/1961 Great Britain .......... 274/9 B

*Primary Examiner*—Harry N. Haroian
*Assistant Examiner*—A. Jason Mirabito
*Attorney, Agent, or Firm*—James H. Barksdale, Jr.

[57] ABSTRACT

An apparatus for unloading discs from a disc cartridge when the cartridge is inserted into an intake hopper, or loading station, of a recorder, or the like. The apparatus is incorporated into the hopper and is generally defined by a cantilevered unloader and a cantilevered gate. When the cartridge is inserted into the hopper a first extent, the cantilevered gate is pivoted, enabling the remainder of the apparatus such that the discs in the cartridge can be engaged by the unloader. Complete insertion of the cartridge into the hopper will result in downward rotation of the unloader for engaging center openings in the discs. The unloader will then hold the discs in place in the hopper until the cartridge has been completely removed. Complete removal of the cartridge will allow the cantilevered gate to return to its normal position, causing the unloader to rotate in an upward direction and out of engagement with the discs.

10 Claims, 4 Drawing Figures

DISC UNLOADING APPARATUS

CROSS-REFERENCE TO RELATED APPLICATION

U.S. Pat. application Ser. No. 209,800, filed Dec. 20, 1971, entitled "Dictation Apparatus with Disc Loading, Feeding, and Ejecting Feature," having J. D. Bruer et al. as inventors now U.S. Pat. No. 3,789,160.

BACKGROUND OF THE INVENTION

1. Field of the Invention

This invention relates to disc recording, transcribing, etc., apparatuses in general. More specifically, this invention relates to an apparatus positioned in a disc intake hopper for unloading discs from a cartridge when the cartridge is inserted into, and withdrawn from, the hopper.

2. Description of the Prior Art

Heretofore, dictation machines have been provided with media input stations which can broadly be defined as input hoppers. For example, the IBM Executary* Dictating Unit (Model 271) has an opening in the side for receiving a recording belt. Also, means are provided for automatically loading the belt following partial insertion thereof into the opening. Automatic loading in this respect is related to phasing and/or proper positioning of the belt for recording, reproducing, etc. When disc recording media are considered, a completely different apparatus is required. This is particularly the case when a stack of discs are to be loaded into, and properly positioned within the machine from a cartridge. When the above cross-referenced application is reviewed, there are no machine means for removing the discs from the cartridge and insuring proper positioning in the intake hopper.

*Registered Trademark, International Business Machines Corporation

SUMMARY OF THE INVENTION

By incorporating the unloading apparatus of this invention into the intake hopper of a dictation apparatus, discs can be removed from a cartridge and properly positioned in a time saving and efficient manner. The unloading apparatus is adapted for communication with a disc cartridge, and is structured to cooperate with the center openings in discs for unloading the discs from the cartridge. The apparatus is made up of a cartridge actuator, a cantilevered gate, and a cantilevered unloader having an integral disc finger. The cantilevered gate is pivoted upon initial insertion of the cartridge into the hopper. The pivoting of the gate enables the cantilevered unloader. That is, on further insertion of the cartridge, the cartridge actuator is displaced and the unloader is permitted to rotate in a downward direction. During this downward rotation the integral disc finger will engage the center openings in the discs. The finger will then hold the discs in the proper position during withdrawal of the cartridge. Complete withdrawal of the cartridge will result in restoration of the cantilevered gate which then causes the cantilevered unloader to rotate up and out of engagement with the discs.

DESCRIPTION OF THE PREFERRED EMBODIMENT

Figure 1:
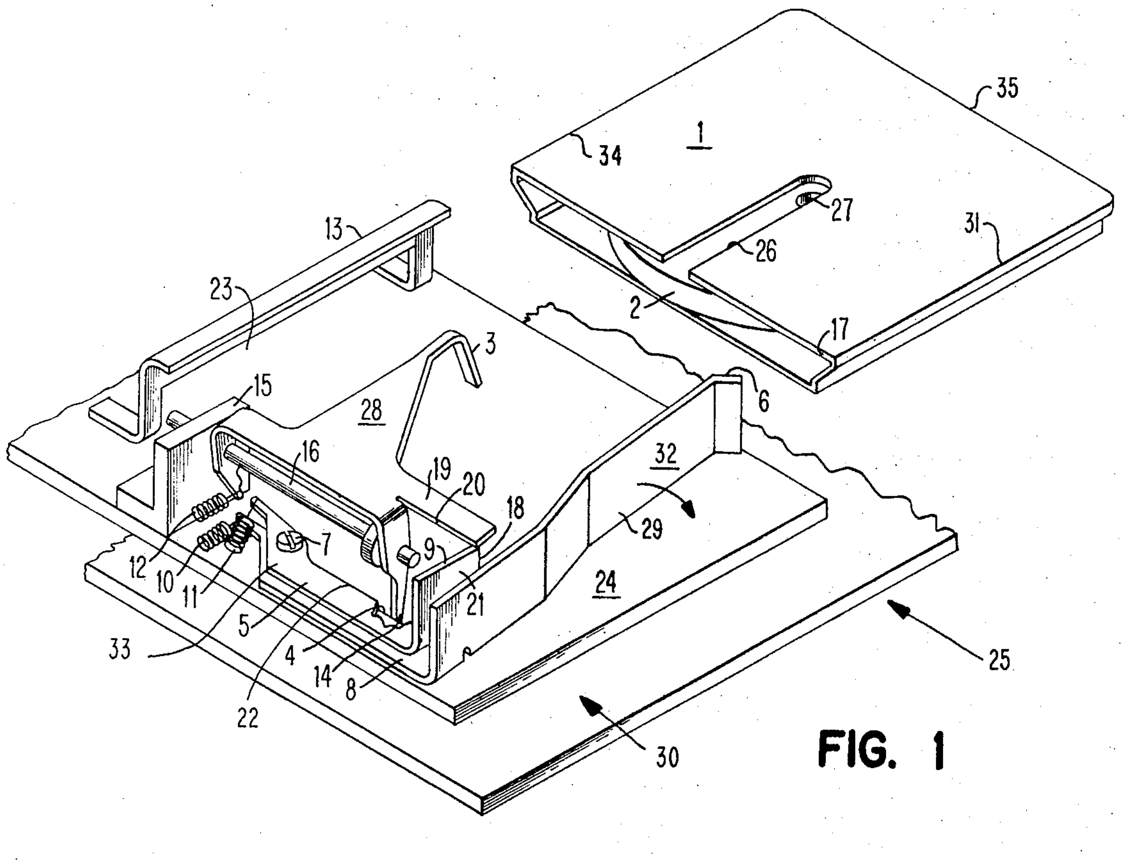
In FIG. 1 there is shown in perspective the unloading apparatus of this invention prior to insertion of a cartridge for loading a number of discs into a dictation apparatus.

Referring first to FIG. 1, there is shown a portion of a dictation apparatus generally designated by reference numeral 25. Apparatus 25 is provided with a throat (not shown) into which a cartridge 1 is to be inserted for disc loading purposes. Behind the throat is located a loading station, or input hopper, having incorporated therein the disc unloading apparatus of this invention. The disc unloading apparatus is generally designated by reference numeral 30. When apparatus 25 is to be loaded with a number of recording discs 2 contained in disc cartridge 1, cartridge 1 is inserted through the throat and guided along one side by a cartridge guide 13. Opposite guide 13 is a cantilevered gate and guide 29. Gate 29 is pivotable about a pivot screw 7 and spring biased in the position shown by a spring 10. Pivot screw 7 is maintained in a base plate 24. Gate 29 is L-shaped and has a guide surface 32, an angularly extending wing 6, and a trip arm 8 having a trip surface 4.

Also pivotable about, and carried by, pivot screw 7 is a cartridge actuator 33 which is spring biased in the position shown by a spring 11. Actuator 33 has a trip arm 5 having a trip surface 22, and an upright 21 having an upper surface 9 and an abutting surface 18. Surface 18 serves as an abuttment for the leading corner 17 of cartridge 1.

Base plate 24 also maintains a support 15 which is secured thereto (by means not shown). Journaled in an opening in support 15 is a rod 16 about which cantilevered unloader 28 is rotatable in an upward and downward direction. Unloader 28 is spring biased in a downward direction by a spring 12, and has an integral disc finger 3, a latch 19, and a follower arm 14. Unloader 28 is maintained in the position shown in FIG. 1 by surface 22 (partially broken away) acting against integral follower arm 14.

Cartridge 1 comprises an open ended housing having sides 31 and 34 and is adapted to carry a number of discs 2. Cartridge 1 also has an upper surface 35 having an elongated slot 26 for receiving disc finger 3 when unloader 28 rotates in a downward direction for engagement with center openings 27 in discs 2.

Figure 2:
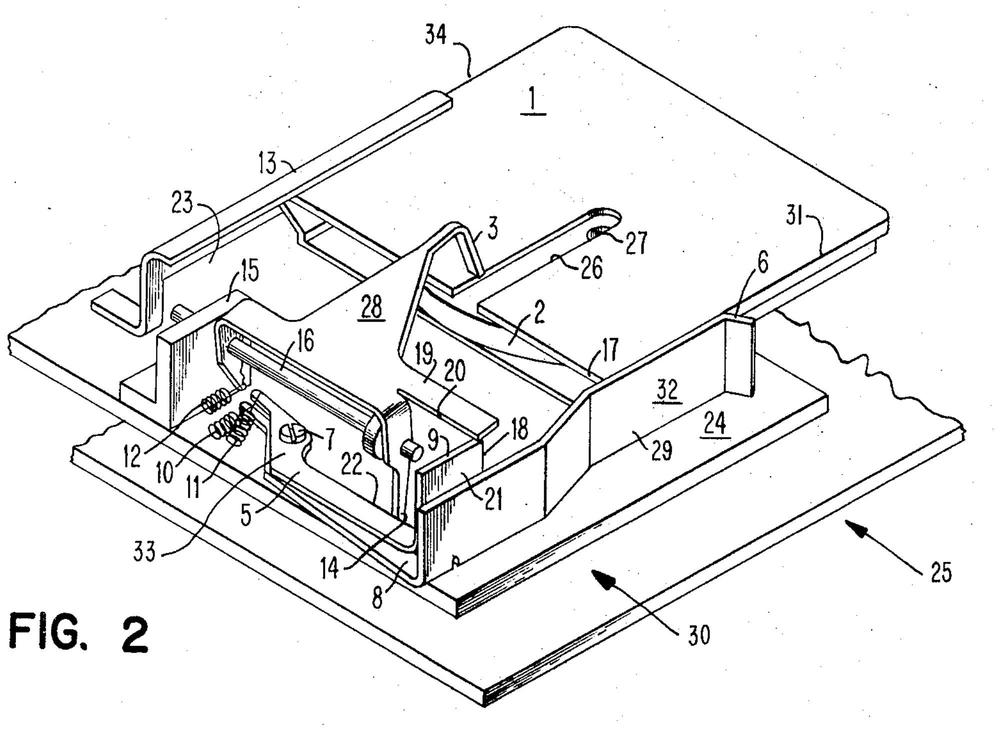
In FIG. 2 the unloading apparatus is depicted with the cartridge partially inserted.

Referring next to FIG. 2 in conjunction with FIG. 1, when cartridge 1 is inserted into the hopper, side 31 of cartridge 1 will contact angularly extending wing 6. When thus contacted, gate 29 will pivot and be displaced to the right, bringing surface 4 out of the rotational path of follower arm 14. Also, after gate 29 has been pivoted to the right, side 31 will side along surface 32. In this respect, gate 29 also acts as a guide for cartridge 1.

When gate 29 has been pivoted and is in the position shown in FIG. 2, cantilevered unloader 28 will still be restrained from rotating in a downward direction by surface 22 acting against arm 14. That is, displacement or rotation of arm 8 during insertion of cartridge 1 will not affect unloader 28. This displacement enables the remainder of the unloading apparatus 30 as will be described in more detail below.

Figure 3:
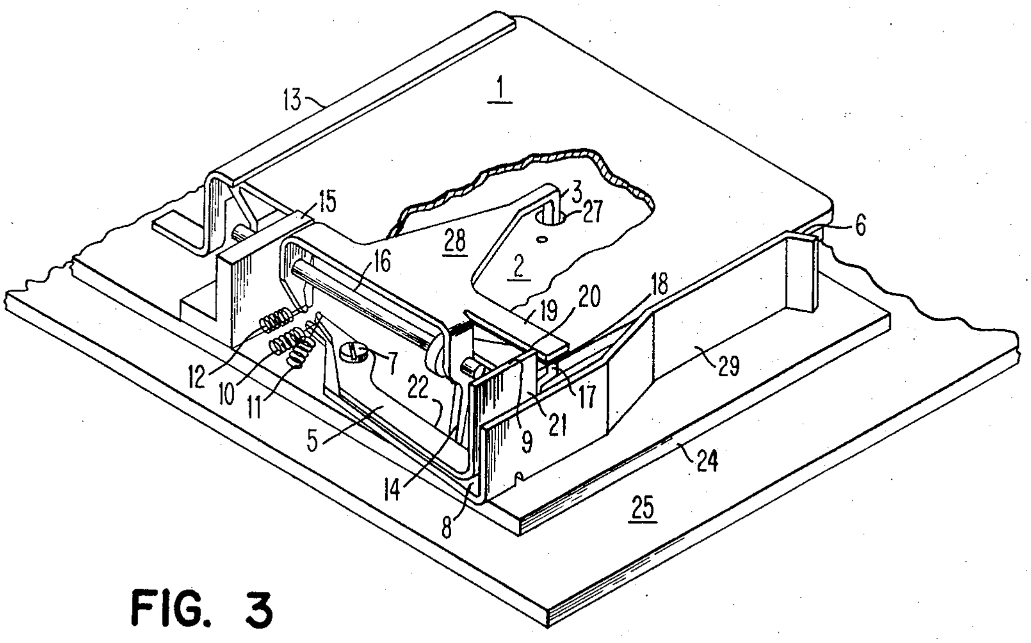
In FIG. 3 there is shown the unloading apparatus with the cartridge fully inserted.

Referring next to FIG. 3, as cartridge 1 is further inserted into the hopper, the leading corner 17 thereof will contact abutting surface 18 of upright 21. When upright 21 is displaced by corner 17 against the action of spring 11, surface 22 will be brought out of reach of follower arm 14. During displacement of upright 21, unloader 28 will rotate in a downward direction under the influence of spring 12 until latch 19 contacts surface 9. Thereafter, as upright 21 is further displaced, latch 19 will ride along surface 9 until surface 9 terminates forming surface 18. The cantilevered unloader 28 will then rotate a further extent in a downward direction and assume the position shown.

With cartridge 1 fully inserted, surface 20 of latch 19 is slightly spaced from surface 18. As cartridge 1 is partially withdrawn, arm 5 will rotate under the influence of spring 11, bringing surface 18 into contact with surface 20. Unloader 28 is now latched in the down position. In this position, unloader 28 has engaged discs 2 with integral finger 3 extending into openings 27.

Figure 4:
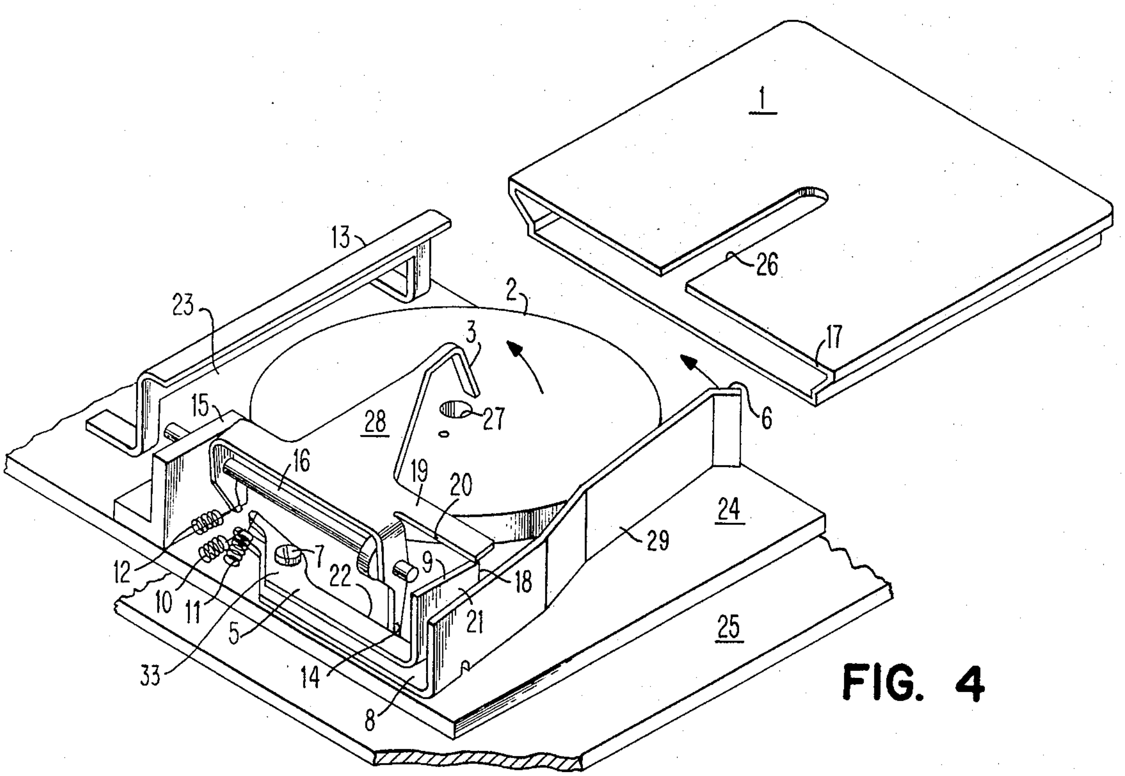
In FIG. 4 there is shown the unloading apparatus with the discs positioned in the loading station after the cartridge has been removed.

Referring next to FIG. 4, as cartridge 1 is removed from the intake hopper and slides past angularly extending wing 6, gate 29 will rotate to the left bringing surface 4 (refer to FIG. 1) into urging engagement with follower 14. This will cause cantilevered unloader 28 to rotate in an upward direction, bringing surface 20 out of contact with surface 18. When this occurs, actuator 33 is released for rotation under the influence of spring 11. This will result in surface 22 contacting follower arm 14 and unloader 28 being rotated in an upward direction. It is to be noted that the characteristics of spring 11 are such that spring 12 is overcome when actuator 33 is released.

Again, it is pointed out that during the initial loading operation, the displacement of cantilevered gate 29 only acts to enable the remainder of apparatus 30. During withdrawal of the cartridge, cantilevered gate 29 acts on cantilevered unloader 28 to ultimately cause it to assume the position shown in FIG. 4.

An important aspect of this invention is that with finger 3 engaging center openings 27, proper alignment of discs 2 will be insured. That is, during withdrawal of cartridge 1, the drag imparted to discs 2 by cartridge 1 will urge essentially the same portions of openings 27 into contact with finger 3. With discs 2 properly aligned, they can be transported (by means not shown) through eject opening 23 to other stations within apparatus 25.

In the above description, reference to a dictation apparatus is meant to include a recording apparatus, a transcribing apparatus, a combined recording and transcribing apparatus, etc., and is also meant to include individual machines as well as machines making up systems. The discs referred to above can be made up of a polymeric substrate having a magnetic oxide coating. Also, as contemplated, the discs are to be used in a dictation apparatus for spiral magnetic recording and reproducing purposes.

In summary, by incorporating the unloading apparatus of this invention into the intake hopper of a dictation apparatus, discs can be removed from a cartridge and properly positioned in a time saving and efficient manner. The unloading apparatus is adapted for communication with a disc cartridge, and is structured to cooperate with the center openings in discs for unloading the discs from the cartridge. The apparatus is made up of a cartridge actuator, a cantilevered gate, and a cantilevered unloader having an integral disc finger. The cantilevered gate is pivoted upon initial insertion of the cartridge into the hopper. The pivoting of the gate enables the cantilevered unloader. That is, on further insertion of the cartridge, the cartridge actuator is displaced and the unloader is permitted to rotate in a downward direction. During this downward rotation the integral disc finger will engage the center openings in the discs. The finger will then hold the discs in the proper position during withdrawal of the cartridge. Complete withdrawal of the cartridge will result in restoration of the cantilevered gate which then causes the cantilevered unloader to rotate up and out of engagement with the discs.

While the invention has been particularly shown and described with reference to a particular embodiment, it will be understood by those skilled in the art that various changes in form and detail may be made without departing from the spirit and scope of the invention.

What is claimed is:

1. An apparatus for unloading a cartridge containing a number of discs, said apparatus comprising:
   a. a gate operable by said cartridge when said cartridge is inserted a first extent into said apparatus;
   b. an actuator operable by said cartridge upon contact and further insertion of said cartridge into said apparatus; and
   c. an unloader enabled upon operation of said gate for engaging said number of discs upon operation of said actuator.

2. An apparatus according to claim 1 wherein said gate includes means for causing said unloader to be brought out of engagement with said number of discs when said cartridge is withdrawn from said apparatus.

3. An apparatus according to claim 1 wherein said unloader includes means for engaging center openings in said number of discs and maintaining said discs in said apparatus during withdrawal of cartridge from said apparatus.

4. An apparatus according to claim 3 wherein said unloader includes a follower controlled by said actuator.

5. An apparatus according to claim 4 wherein said unloader includes a latch supportable by said actuator upon operation of said gate by said cartridge when said cartridge is inserted a first extent into said apparatus.

6. An apparatus according to claim 5 wherein said actuator includes means for supporting said latch such that said unloader is maintained out of engagement with said number of discs when said cartridge is inserted said first extent.

7. An apparatus according to claim 6 wherein said actuator includes abuttment means defined by the termination of said supporting means for maintaining said unloader in engagement with said number of discs until after said cartridge has been withdrawn from said apparatus.

8. An apparatus according to claim 7 wherein said gate includes means for guiding said cartridge into, and out of, said apparatus.

9. An apparatus according to claim 8 wherein said gate includes a wing for cooperating with said cartridge upon initial insertion of said cartridge into said apparatus.

10. An apparatus according to claim 9 including a cartridge guide opposite said gate having an opening through which said number of discs can be ejected after said cartridge has been withdrawn from said apparatus.

* * * * *